(12) United States Patent
Ruan et al.

(10) Patent No.: US 9,605,152 B2
(45) Date of Patent: Mar. 28, 2017

(54) ASPHALT COMPOSITIONS FOR ROOFING APPLICATIONS, METHODS FOR MAKING THE SAME, AND FILLED ASPHALT MATERIAL COMPRISING THE SAME

(71) Applicant: Honeywell International Inc., Morristown, NJ (US)

(72) Inventors: Yonghong Ruan, Wayne, NJ (US); Scott Martin Hacker, River Edge, NJ (US); Paul Chi Lem, Randolph, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/794,263

(22) Filed: Jul. 8, 2015

(65) Prior Publication Data

US 2016/0017148 A1    Jan. 21, 2016

Related U.S. Application Data

(60) Provisional application No. 62/025,395, filed on Jul. 16, 2014.

(51) Int. Cl.
    *C08L 95/00*    (2006.01)

(52) U.S. Cl.
    CPC ........... *C08L 95/00* (2013.01); *C08L 2555/86* (2013.01)

(58) Field of Classification Search
    CPC ............................. C08L 95/00; C08L 2555/86
    See application file for complete search history.

(56) References Cited

U.S. PATENT DOCUMENTS

| | | | |
|---|---|---|---|
| 4,382,989 A | 5/1983 | Chang et al. | |
| 4,832,874 A | 5/1989 | Nohmi | |
| 5,286,544 A | 2/1994 | Graham | |
| 5,328,943 A | 7/1994 | Isobe et al. | |
| 5,451,621 A | 9/1995 | Usmani et al. | |
| 6,114,418 A | 9/2000 | Isobe et al. | |
| 6,583,202 B1 | 6/2003 | Grube et al. | |
| 7,317,045 B2 | 1/2008 | Zanchetta et al. | |
| RE41,167 E | 3/2010 | Stuart, Jr. et al. | |
| 7,678,467 B2 | 3/2010 | Falkiewicz et al. | |
| 7,951,240 B2 | 5/2011 | Trumbore et al. | |
| 8,637,116 B2 | 1/2014 | Shiao et al. | |
| 8,753,442 B2 | 6/2014 | Trumbore et al. | |
| 8,901,211 B2 | 12/2014 | Stephens et al. | |
| 2007/0254989 A1 | 11/2007 | Zanchetta et al. | |
| 2010/0143651 A1 | 6/2010 | Silvis et al. | |
| 2010/0233408 A1 | 9/2010 | Zickell et al. | |
| 2012/0132565 A1* | 5/2012 | Aldous | B01F 5/0413 208/22 |
| 2012/0252939 A1 | 10/2012 | Hacker et al. | |
| 2013/0123396 A1* | 5/2013 | Pochert | C08J 5/043 524/68 |
| 2014/0069297 A1 | 3/2014 | Rotz et al. | |

FOREIGN PATENT DOCUMENTS

| | | | |
|---|---|---|---|
| AU | 704340 B1 | | 4/1999 |
| CN | 1990590 A | | 7/2007 |
| CN | 100567400 C | | 12/2009 |
| EP | 1524300 A1 | | 4/2005 |
| JP | 2006/022287 | * | 1/2006 |
| JP | 4902255 B2 | | 3/2012 |

OTHER PUBLICATIONS

Cross, R.; A Handbook of Petroleum Asphalt and Natural Gas, 1922, p. 367-372.*
Kogel, J.E., et al.; Industrial Minerals and Rocks, 2006, p. 490.*
Zhang, H.; Building Materials in Civil Engineering, 2011, p. 253-289.*
Durmus, A., et al.; European Polymer Journal, 2007, vol. 43, p. 3737-3749.*
The International Search Report mailed Aug. 28, 2015 in International Application No. PCT/US2015/039853.
Fuentes-Auden, C. et al., "Evaluation of thermal and mechanical properties of recycled polyethylene modified bitumen", Elsevier Ltd. Polymer Testing, Sep. 9, 2008, pp. 1005-1012, vol. 27, Huelva, Spain.
Navarro, F.J. et al., "Novel recycled polyethylene/ground tire rubber/bitumen blends for use in roofing applications: Thermo-mechanical properties", Elsevier Ltd. Polymer Testing, Mar. 16, 2010, pp. 588-595, vol. 29, Huelva, Spain.
Hailesilassie, B.W. et al., "Adhesive blister propagation under an orthotropic bituminous waterproofing membrane", Elsevier Ltd. Constructions and Building Materials, Jul. 21, 2013, pp. 1171-1178, vol. 48, Duebendorf, Switzerland.
Kersey, T., "Modified Bitumen Blend Technology", Interface, RCI, Inc., Jun. 2000, pp. 4-8.
Eastman Chemical Company, "Eastoflex amorphous polyolefins (APOs) as bitument modifiers for roofing membrane production", Product brochure, retrieved from Internet on Jul. 16, 2014, <http://www.eastman.com/Literature_Center/W/WA40.pdf>, Mar. 2014, Kingsport, TN.
Ramachandran, V.S. et al., Excerpt from "Handbook of Thermal Analysis of Constructions Materials", Chapter 15—Roofing Materials, 2002, pp. 611-632, William Andrew Publishing/Noyes.
The International Bureau of WIPO, International Preliminary Report on Patentability for International Application No. PCT/US2015/039853 mailed Jan. 26, 2017.

* cited by examiner

*Primary Examiner* — Robert Jones, Jr.
(74) *Attorney, Agent, or Firm* — Lorenz & Kopf, LLP

(57) ABSTRACT

Asphalt compositions for roofing applications are provided, as well as filled asphalt material comprising the asphalt compositions and methods for making asphalt compositions and filled asphalt material. More particularly, the asphalt compositions comprise non-oxidized base asphalt; and a low molecular weight polyolefin present in an amount of from about 0.5 to about 15 wt % based on the total weight of the asphalt composition. The asphalt composition has a softening point from about 87.8 to about 160° C. (about 190 to about 320° F.), a penetration of greater than 12 decimillimeters @ 25° C., as well as improved stain resistance and heat resistance.

19 Claims, No Drawings

ASPHALT COMPOSITIONS FOR ROOFING APPLICATIONS, METHODS FOR MAKING THE SAME, AND FILLED ASPHALT MATERIAL COMPRISING THE SAME

CROSS-REFERENCE TO RELATED APPLICATIONS

This application is related to and claims all available benefit of U.S. Provisional Patent Application 62/025,395 filed Jul. 16, 2014, the entire contents of which are herein incorporated by reference.

TECHNICAL FIELD

The technical field relates generally to asphalt compositions, methods for making asphalt compositions, and compositions comprising asphalt compositions. More particularly, the technical field relates to asphalt compositions for roofing applications, methods for making the same, and filled asphalt material comprising the same.

BACKGROUND

Asphalt, or bitumen, is commonly collected or synthesized and refined for use in paving and roofing applications. The type of asphalt suitable for paving applications is commonly referred to as "paving grade asphalt," or "paving asphalt," or "asphalt cement." Asphalt suitable for roofing applications is commonly referred to as "roofing flux," "flux asphalt," or simply "flux." In general, paving asphalt is harder than roofing flux. In fact, roofing flux is initially too soft to be used, especially for roofing shingle manufacturing. Rather, a process called "air blow," or "oxidation," is applied to roofing flux to make it harder and, therefore, more suitable for roofing applications. The product of such air blow processes is called "blown coating" or "oxidized asphalt" or "oxidized bitumen" and is suitable for use to make roofing products, such as roofing shingles.

For roofing applications, oxidized flux asphalt may be applied directly to a roof structure, and aggregate spread over and pressed into the asphalt to form a built up roof. Alternatively, flux asphalt or oxidized flux asphalt may be coated onto fiberglass, polyester or other sheet-like material to form a membrane or shingle. Inorganic filler such as mineral filler may also be mixed into the flux asphalt or oxidized flux asphalt for roofing applications. Additional components such as recycled material, performance additives, or combinations thereof, may be added to the asphalt.

The strength and durability of asphalt materials depend on various factors including the properties of the materials used and the environmental conditions to which the asphalt material is exposed. Conventional asphalt materials suffer from various drawbacks due to exposure to environmental conditions, such as, for example, developing oil bleeding. Oil bleeding can affect adhesion between waterproof membranes and between the waterproof membrane and building decks. Oil bleeding can also display as surface oil stains, which are aesthetically undesirable to end users. Also there is a tendency, in hot weather when the asphalt roofing product does not have sufficient heat resistance, for the surface and/or the back coating layer of an installed asphalt product to soften and slide, thereby leaving portions of the roof unprotected.

To improve resistance of asphalt materials to these and other problems, various materials may be added to asphalt compositions before use in roof products. For example, high temperature performance additives, e.g., plastomers and/or elastomers, and/or low temperature performance additives, e.g., process oils, may be incorporated into the asphalt materials. The high temperature performance additives tend to increase the modulus of the asphalt material at higher temperatures to resist permanent deformation and creep, while the low temperature performance additives tend to increase flexibility and ductility of the asphalt material at lower temperatures to resist brittleness and cracking. While the roofing industry continues its efforts to develop a balance between these two categories of additives, sliding of roof products continues to be a challenge for the roofing industry. In addition, neither type of additive addresses the need for oil bleeding resistance.

Accordingly, it is desirable to provide asphalt compositions for producing roofing products with improved oil bleeding resistance and increased heat resistance. It also is desirable to provide methods for making such asphalt compositions. In addition, it is desirable to provide filled asphalt materials comprising such asphalt compositions. Additional beneficial features and characteristics of the asphalt compositions will become apparent from the subsequent detailed description and examples.

SUMMARY

An asphalt composition for use in roofing applications is provided which comprises: non-oxidized base asphalt and a low MW polyolefin present in an amount of from about 0.5 to about 15 wt % based on the total weight of the asphalt composition. The asphalt composition has a softening point from about 87.8 to about 160° C. (about 190 to about 320° F.), and a penetration of greater than about 12 deci-millimeters (dmm, or 0.1 mm). The low MW polyolefin has a crystallinity of from about 30 to about 100 percent (%).

Another exemplary embodiment provides a filled asphalt material for use in roofing applications, which comprises: an asphalt composition present in an amount of about 30 to about 99 wt. % of the filled asphalt material, and an inorganic filler, recycled asphalt materials, or a combination thereof, which are present in a total amount of from about 1 to about 70 wt % of the filled asphalt material. The asphalt composition comprises non-oxidized base asphalt and a low MW polyolefin which is present in an amount of from about 0.5 to about 15 wt %, based on the total weight of the asphalt composition, wherein said asphalt composition has a softening point from about 87.8 to about 160° C. (about 190 and about 320° F.), and a penetration of greater than about 12 deci-millimeters (dmm, or 0.1 mm). The low MW polyolefin has a crystallinity of from about 30 to about 100 percent (%).

In accordance with still another exemplary embodiment, a method for making an asphalt composition for use in roofing applications is provided. The method comprises the step of combining a low MW polyolefin and a non-oxidized base asphalt at an elevated temperature to form the asphalt composition, wherein the low MW polyolefin is present in an amount of from about 0.5 to about 15 wt %, based on the total weight of the asphalt composition. The low MW polyolefin has a crystallinity of from about 30 to about 100 percent (%). Additionally, the asphalt composition has a softening point from about 87.8 to about 160° C. (about 190 and about 320° F.), and a penetration of greater than about 12 deci-millimeters (dmm, or 0.1 mm).

DETAILED DESCRIPTION

The following description is merely exemplary and is not intended to limit the invention or the application and uses of the invention. Furthermore, there is no intention to be bound by any theory presented in the preceding background or the following description.

The various embodiments contemplated herein relate to asphalt compositions having improved oil bleeding resistance and improved heat resistance properties that are suitable for producing roofing products. Such roofing products include, without limitation, roofing shingles, roofing membranes (also known as roll roofing) and waterproof membranes for various construction applications (tunnel, commercial & residential building, etc.). In an exemplary embodiment, the asphalt composition comprises non-oxidized base asphalt and a minor amount of low MW polyolefin. It is notable that the presence of low MW polyolefin in the asphalt composition increases the oil bleeding resistance and improves the heat resistance properties, but does not generally interfere with other important properties of the roofing products in a negative manner, such as cold bending, softening point, penetration, and viscosity, even when the asphalt composition contains other components such as inorganic filler, recycled material, performance additives, or combinations thereof. Furthermore, a filled asphalt material is provided which comprises the aforesaid asphalt composition, as well as inorganic filler, recycled material, or combinations thereof. Other well-known additives such as oils, plasticizers, anti-oxidants, and the like may also be included. A method of producing the asphalt compositions and filled asphalt materials is also provided.

Without wishing to be bound by theory, it is believed that oil bleeding or discoloration of asphalt roofing products occurs mainly when low molecular weight oily fractions of the roofing product migrate to the surface of the asphalt roofing product. This can result in the loss of adhesion between waterproof membranes and between the waterproof membrane and building deck. These low molecular weight oils can also be adsorbed by roofing granules (e.g., filler or aggregate) that are embedded in the top surface of the roofing product and cause the discoloration of the roofing granules. Asphalt roofing products with discolored granules are aesthetically unacceptable to end users and, therefore, cannot be used. Thus, a significant amount of asphalt roofing material is wasted. Sometimes the loss of adhesion or granule discoloration happens after the roofing product was installed, and as a result, the entire roof has to be removed and replaced. This type of oil bleeding or discoloration results in both raw material waste and a significant amount of warranty claims, which diminishes roofing manufacturers' profitability. One measure of an asphalt composition's resistance to developing oil bleeding or discoloration is known as the stain index and may be measured by any standard method, such as ASTM D2746. It has been found that asphalt compositions having a stain index, as measured using method ASTM D2746, of less than about 50 are somewhat, but not especially, resistant to oil staining over time when used in asphalt roofing products. Similarly, asphalt compositions having a stain index of less than about 40, or even less than about 30, are even more resistant to oil staining and, therefore, advantageous over those having stain index of only less than about 50. Asphalt compositions to be used for producing asphalt roofing products that have a stain index of less than 20 are even more advantageous, and asphalt compositions having a stain index of less than 15 have the most resistance to oil staining and are most advantageous for asphalt roofing products.

The heat resistance characteristic of an asphalt composition may be quantified by measuring the linear movement of the coating of the heated (about 90-110° C.), suspended asphalt composition specimen, relative to the fiber reinforcement stationary mat, typically in millimeters (mm). Thus, higher heat resistance is desirable for asphalt roofing products because such resistance is indicated by less movement and slippage. More particularly, it is understood that without mineral filler a slippage value of less than about 20 mm would indicate minimal, but some, resistance to movement and slippage for asphalt roofing products containing the asphalt composition under hot weather conditions. Moreover, it is desirable that the asphalt composition have a slippage value of less than about 15 mm, or even more desirably less than about 10 mm, or most desirably less than about 5 mm, to be acceptable for use in asphalt roofing products such as roofing shingle, roofing membranes and waterproof membranes. For asphalt compositions with filler, the most beneficial slippage value is less than 2 mm.

Similarly, as will be familiar and understood to persons of ordinary skill in the art, other characteristics of asphalt compositions intended for use in asphalt roofing products are important, quantified and monitored. For example, the cold bending temperature is the minimum temperature at which an asphalt composition sample will not break or fracture under bending. For asphalt compositions to be useful for roofing applications, acceptable cold bending temperatures are about −20° C. (−4° F.) or lower for SBS modified bitumen roofing membrane, and −5° C. (23° F.) or lower for atactic polypropylene (APP)-modified bitumen roofing membrane. For roofing shingles in the US, acceptable cold bending temperatures are about 25° C. (77° F.).

Also, asphalt compositions do not have distinct melting points but rather a range of temperatures within which the materials begin and continue to soften without melting. It is beneficial to know the temperature ranges in which asphalt compositions will become too soft to be used in construction and manufacturing and, therefore, the softening point of an asphalt composition is an important characteristic to be measured. Asphalt compositions suitable for use in roofing applications and products should have a softening point of from about 87.8 to about 160° C. (about 190 to about 320° F.). It is desired that the asphalt composition has a softening point, in ° C., of at least about 90.6, 93.3, 96.1, 98.9, 101.7, 104.4, 110, 112.8, 115.6, 121.1 or 126.7° C. (i.e., at least about 195, 200, 205, 210, 215, 220, 230, 235, 240, 250, or 260° F., respectively), and independently, in ° C., of not more than about, 157.2, 154.4, 151.7 or 148.9 (315, 310, 305, or 300° F., respectively).

The penetration test provides a measure of the consistency of an asphalt material at a given temperature. The consistency is a function of the types of chemical constituents of the asphalt and their relative amounts in the asphalt, which are determined by the source petroleum and the method of processing at the refinery. The penetration is measured using a standard needle which is brought to the surface of the asphalt specimen, at right angles, and allowed to penetrate the asphalt for a period such as 5 seconds, while the temperature of the specimen is maintained at certain value such as 25° C. The penetration is measured in tenths of a millimeter (deci-millimeter, 0.1 mm, dmm) and the deeper the needle penetrates into the asphalt specimen, the larger the reported value, and the softer the asphalt.

Furthermore, asphalt compositions intended for use in asphalt roofing products may have a penetration value, at 25° C., of greater than about 10 dmm (0.1 millimeters), such as for example, greater than about 12 dmm. It is desired that the asphalt composition has a penetration value, in dmm, of greater than about 10, 12, 15, 20 or 25, and independently, of not more than about 75, 70, 60, 55, 50, 45, 40, 35, 30, 25 or 20.

The advantageous softening point (SP) and penetration (PEN) characteristics of asphalt compositions may be reported together, as complementary characteristics. For example, without limitation, an asphalt composition as contemplated herein for use in asphalt roofing applications may have a SP from about 87.8 to about 160° C. (about 190 to about 320° F.) with a PEN of greater than 12 dmm, at 25° C., or a SP from about 87.8 to about 112.8° C. (about 190 to about 235° F.) with a PEN of greater than about 15 dmm, or a SP from about 90.6 to about 104.4° C. (about 195 to about 220° F.) with a PEN between about 15 and 40 dmm, or a SP from about 93.3 to about 96.1° C. (about 200 to about 215° F.) with a PEN from about 15 to about 25 dmm. In some embodiments, the asphalt composition will have a SP from about 87.8 to about 160° C. (about 190 to about 320° F.) with a PEN, at 25° C., of from about 15 to about 26 dmm, or a SP from about 98.9 to about 148.9° C. (about 210 to about 300° F.) with a PEN, at 25° C., of from about 20 to about 50 dmm, or even a SP from about 121.1 to about 160° C. (about 250 to about 320° F.) with a PEN of from about 15 to about 40 dmm, to be suitable for use in asphalt roofing products and applications.

As noted above, the asphalt composition contemplated herein comprises a non-oxidized base asphalt and a low MW polyolefin. All types of asphalt, naturally occurring, synthetically manufactured and modified, may be used in accordance with the asphalt compositions contemplated herein. Naturally occurring asphalt is inclusive of native rock asphalt, lake asphalt, and the like. Synthetically manufactured asphalt is often a byproduct of petroleum refining operations and includes air-blown (oxidated) asphalt, blended asphalt, cracked, residual or recycled asphalt, petroleum asphalt, propane asphalt, straight-run asphalt, thermal asphalt, and the like. Modified asphalt includes base asphalt (e.g., neat or unmodified asphalt that can be naturally occurring or synthetically manufactured) modified with elastomers, plastomers, or various combinations of these.

The asphalt Performance Grade (PG) rating system categorizes asphalt compositions used in asphalt products based on the asphalt composition's performance at different temperatures. An asphalt composition having a PG rating of about 64-22, for example, means that the asphalt composition can be used in a climate where the pavement end product reaches temperatures as high as +64° C. and as low as −22° C. Temperatures outside the PG range of the asphalt composition usually lead to deterioration of the asphalt product in which it is used.

"Base asphalt," as this term is used herein is bitumen, or asphalt, which is defined by the ASTM as a dark brown to black cementitious material in which the predominant constituents are bitumens that occur in nature or are obtained in petroleum processing. Asphalts typically contain saturates, aromatics, resins and asphaltenes.

The type of asphalt suitable for paving applications is commonly referred to as "paving grade asphalt," or "paving asphalt," or "asphalt cement." Asphalt suitable for roofing applications is commonly referred to as "roofing flux," "flux asphalt," or simply "flux." In general, paving asphalt is harder than roofing flux, as indicated by their penetration grade. The most popularly used paving asphalt has a penetration around 50/70 or 60/90 dmm (0.1 millimeters), and on the other hand, roofing flux's penetration is generally above 150-200 dmm. Accordingly, roofing flux won't be used directly, especially for roofing shingle manufacturing, because it is too soft. Rather, a process called "air blow" is applied to roofing flux to make it harder and, therefore, more suitable for roofing applications'. During the air blow process, air is bubbled through hot liquid roofing flux for a certain amount of time (e.g., 2 to 8 hours). Oxygen in the air reacts with asphalt flux and its stiffness is thereby increased dramatically, indicated by penetration of the roofing flux dropping from greater than about 150-200 dmm to about 20 dmm. The product of such air blow processes is called "blown coating" or "oxidized asphalt" or "oxidized bitumen" and is useful for making roofing products, such as roofing shingles.

"Non-oxidized base asphalt," as this term is used herein, includes base asphalt that has not been subjected to or undergone an oxidizing, or air blowing, step as that process has been described hereinabove. In other words, paving grade asphalt or roofing flux type asphalt is used in the asphalt compositions contemplated herein without first performing an air blowing step to harden it before combining with the low MW polyolefin or inorganic filler, recycled material, performance additives, etc.

Adding low MW polyolefins to asphalt compositions, in amounts from about 0.1 to about 15 percent by weight of the asphalt composition, improves the oil bleeding resistance and heat resistance properties of the asphalt compositions and of roofing products that incorporate such asphalt compositions. "Low MW polyolefin," as this term is used herein, means a polyolefin-containing polymer, or a blend of two or more polyolefin-containing polymers, each of which has a weight average molecular weight ($M_w$) of from about 500 to about 20,000 Daltons, and comprises from about 80 to about 100 wt %, based on the total weight of the low MW polyolefin, of one or more olefinic monomers selected from: ethylene, propylene, butene, hexene, and octene. Thus, the low MW polyolefins may be homopolymers comprising only a single type of olefin monomer, or copolymers comprising two or more types of olefin monomers. Furthermore, low MW polyolefins, as this term is used herein, include but are not limited to polyolefin waxes, i.e., polyolefins which are solid at or near room temperature and have low viscosity when above their melting point. The low MW polyolefins may be functionalized. Functionalized low MW polyolefins may be homopolymers or copolymers. Further, functionalized low MW polyolefins comprise one or more functional groups including for example, without limitation, an acid, an ester, an amine, an amide, an ether, and anhydride. The low MW polyolefins may be functionalized. Additionally, the low MW polyolefins may be oxidized.

In an exemplary embodiment, the low MW polyolefin has an olefin content of from about 50 to about 100 wt %, based on the total weight of the low MW polyolefin. It is desired that the low MW polyolefin has an olefin content in wt %, based on the total weight of the low MW polyolefin, of at least about 55, 60, 65, 70, 75, 80, 85, 90, or 95, and independently, of not more than about 98, 95, 92, 90, 85, 80, or 75.

As already mentioned, the low MW polyolefin has a $M_w$ of from about 500 to about 20,000 Daltons. It is desired that the low MW polyolefin has a $M_w$ in Daltons of at least about 500, 1,000, 2,000, 3,000, 4,000, 5,000, 6,000, or 7,000, and independently, of not more than about 20,000, 18,000, 15,000, 12,000, or 10,000. Where the low MW polyolefin comprises a combination of more than one type of polyolefin, the $M_w$ of each type of polyolefin in the combination shall individually be within the above-stated range of about 500 to about 20,000 Daltons.

Generally, suitable low MW polyolefins include, without limitation, polyethylene homopolymers, polypropylene homopolymers, copolymers of two or more of ethylene, propylene butene, hexane and octene, functionalized derivatives of said homopolymers, functionalized derivatives of said copolymers, or combinations of unfunctionalized and functionalized low MW polyolefins. Some Fischer-Tropsch waxes, i.e., those that satisfy the above-defined characteristics of low MW polyolefins, may also be used in the asphalt compositions contemplated and described herein.

Examples of suitable functionalized low MW polyolefins include, without limitation, maleated polyethylene, maleated polypropylene, ethylene acrylic acid copolymers, ethylene vinyl acetate copolymers, oxidized polyethylene, especially oxidized high density polyethylene, and combinations thereof.

One category of suitable low MW polyolefin includes certain HONEYWELL TITAN® polyolefins, which include homopolymers of polyethylene or polypropylene and are commercially available from Honeywell International Inc., located in Morristown, N.J., U.S.A. More particularly, one or more of the HONEYWELL TITAN® 8880, 8570, 8650, 8903, and 8822 are suitable for use as the low MW polyolefin. In an exemplary embodiment, the low MW polyolefin comprises a functionalized high density polyethylene such as HONEYWELL TITAN® 8903.

In an exemplary embodiment, the low MW polyolefin is present in the asphalt composition in an amount of from about 0.1 to about 15 percent by weight (wt %) of the asphalt composition. It is desired that the low MW polyolefin is present in the asphalt composition in an amount, in wt %, based on the total weight of the asphalt composition of at least about 0.1, 0.2, 0.3, 0.4, 0.5, 0.6, 0.7, 0.8, 0.9, 1.0, 1.2, 1.5, 1.8, 2.0, 2.2, 2.5, or 3.0 and independently, of not more than about 15, 12, 10, 8, 6, 5, 4.5, 4.0, 3.5, 3.0, 2.5, 2, 1.5, 1.4, 1.3, 1.2, 1.1 or 1. For example, the total content of low MW polyolefin in the asphalt composition may be from about 0.5 to about 10 wt %, or from about 0.5 to about 7 wt %, or from about 1 to about 6 wt %, or from about 2 to about 5 wt %, or even from about 0.5 to 2.0 wt %, based on the total weight of the asphalt composition.

In an exemplary embodiment, the asphalt composition comprises a non-oxidized base asphalt and a low MW polyolefin in an amount from about 1 to about 6 wt %, based on the total weight of the asphalt composition. In such embodiments, the asphalt composition may further comprise, in addition to the base asphalt, a second type of asphalt, such as GILSONITE®, Lake Trinidad Asphalt, Buton Asphalt, or other asphalt that will add hardness to the base asphalt, in an amount of from about 5 to about 20 wt %, based on the total weight of the asphalt composition. For example, the second type of asphalt may be present in the asphalt composition in an amount of at least 6, 7, 8, or 9 wt % and, independently, no more than about 19, 18, 17, 16, 15, 14, 13, 12, 11, or 10 wt %, based on the total weight of the asphalt composition. Also in such embodiments, the asphalt composition has a SP from about 87.8 to about 160° C. (about 190 to about 320° F.), a PEN, at 25° C., of from about 12 to about 26 dmm, and a stain index of less than about 20. For example, it is desired in such embodiments that the asphalt composition has a penetration value, in dmm, of greater than about 14, 15, or 16 and, independently, of not more than about 25 or 24, such as from about 15 to about 26, or about 16 to about 24.

Performance additives such as plastomers, elastomers, or both are well-known in the industry for use in asphalt roofing products to expand the temperature ranges at which such products can be used without serious defect or failure. The asphalt compositions may comprise one or more performance additives that are present in a total amount of from about 1 to about 15 wt %, based on the total weight of the asphalt composition. Non-limiting examples of elastomers suitable for modifying the non-oxidized base asphalt include natural or synthetic rubbers including ground tire rubber (GTR), devulcanized GTR, butyl rubber, styrene/butadiene rubber (SBR), styrene/ethylene/butadiene/styrene terpolymers (SEBS), polybutadiene, polyisoprene, ethylene/propylene/diene (EPDM) terpolymers, ethylene/n-butyl acrylate/ glycidyl methacrylate terpolymers, and styrene/conjugated diene block or random copolymers, such as, for example, styrene/butadiene including styrene/butadiene/styrene copolymer (SBS), styrene/isoprene, styrene/isoprene/styrene (SIS) and styrene/isoprene-butadiene block copolymer. The block copolymers may be branched or linear and may be a diblock, triblock, tetrablock or multiblock.

In some embodiments of the asphalt compositions contemplated and described herein, an elastomer may be present in an amount of from about 1 to about 20 wt %, based on the total weight of the asphalt composition. For example, in some embodiments, the elastomer is present in the asphalt composition in an amount, in wt %, based on the total weight of the asphalt composition, of at least about 1, 2, 3, 5, 7, 8, or 9 and independently, of not more than about 15, 14, 13, 12, 11, 10, or 9. In an exemplary embodiment, the elastomer is an SBS copolymer and is present in an amount of, for example without limitation, from about 5 to about 15 wt %, or from about 6 to about 13 wt %, or from about 8 to about 12 wt %, or from about 8 to about 11 wt %, or even from about 9 to 10 wt %, based on the total weight of the asphalt composition. In embodiments of the asphalt composition for use in roofing applications and products which comprises an SBS copolymer, the amount of low MW polyolefin present and still providing performance benefits may be as little as about 2 wt % or less, or even, 1.2 wt % or less, based on the total weight of the asphalt composition.

Non-limiting examples of plastomers suitable for modifying the base asphalt, e.g., for high temperature performance, include thermoplastic polyolefins which soften when heated but only melt at significantly higher temperatures such as polyethylene, oxidized polyethylene, polypropylene, oxidized polypropylene, and functionalized polyolefins such as maleated polyethylene, maleated polypropylene, ethylene acrylic acid copolymers and the like.

In an exemplary embodiment, a filled asphalt material useful for producing roofing products and containing the asphalt composition described hereinabove is provided. Such a filled asphalt material comprises the asphalt composition described above and inorganic filler, recycled asphalt materials, or combination thereof. Recycled asphalt materials suitable for inclusion in the filled asphalt material contemplated and described herein include, without limitation, recycled asphalt pavement (RAP), recycled asphalt shingles (RAS), and combinations thereof. The asphalt composition is generally present in the filled asphalt material in an amount of from about 30 to about 99 wt %, and the inorganic filler, recycled asphalt materials, or combination thereof are present in a total amount of from about 1 to about 70 wt %, based on the total weight of the filled asphalt material.

Inorganic fillers suitable for addition to filled asphalt materials for roofing applications, such as those described herein, may be any inorganic fillers, known now or in the future to persons of ordinary skill in the art, to be appropriate for inclusion in roofing products. Depending upon the intended use of the filled asphalt material, i.e., paving or roofing and, if roofing, asphalt roofing shingles, membranes or waterproof membranes, the inorganic filler may be mineral filler, aggregate, or a combination of these. Mineral filler is typically ground stone or mineral, such as, for example, stone dust, limestone particles, and talc, among others. Stone and/or mineral is typically ground to a particle size of about 180μ or less.

"Aggregate" is a collective term for mineral materials, such as, for example, sand, gravel, or crushed stone. The aggregate may comprise natural aggregate, manufactured aggregate, or a combination thereof. Natural aggregate is typically extracted rock from an open excavation (e.g. a quarry) that is reduced to usable sizes by mechanical crushing. Manufactured aggregate is typically a byproduct of other manufacturing processes such as slag from metallurgical processing (e.g. steel, tin, and copper production). Manufactured aggregate also includes specialty materials that are produced to have a particular physical characteristic not found in natural rock, such as, for example, low density.

In an exemplary embodiment, the filled asphalt material is compounded for a roofing application and the inorganic filler is ground stone or mineral. The filled asphalt material comprises the asphalt composition and the inorganic filler present in amounts of from about 30 to about 99 wt % and from about 1 to about 70 wt % of the filled asphalt material, respectively. The asphalt composition itself comprises non-oxidized base asphalt, the low MW polyolefin, and optionally one or more performance additives, e.g., elastomers, plastomers, or combinations thereof. The low MW polyolefin and the one or more performance additive are present in amounts of from about 0.5 to about 15 wt % and from about 5 to about 15 wt %, based on the total weight of the asphalt composition, respectively.

In an exemplary embodiment, a method for making an asphalt composition is provided. The method comprises combining the low MW polyolefin and non-oxidized base asphalt at an elevated temperature to form the asphalt composition. In one example, the non-oxidized base asphalt and the low MW polyolefin are combined in any suitable mixing device as is well known in the art. In another example, the non-oxidized base asphalt is heated to an elevated temperature of from about 80 to about 190° C., to form a hot liquid asphalt, and the low MW polyolefin is added to the hot liquid asphalt. Alternatively, the non-oxidized base asphalt and the low MW polyolefin can be combined and heated to the elevated temperature to form the hot liquid asphalt.

In another exemplary embodiment, the method includes combining one or more performance additives and the non-oxidized base asphalt at the elevated temperature. In one example, the performance additive(s) and the low MW polyolefin are mixed together to form a blend that is then combined with the non-oxidized base asphalt at the elevated temperature to form the asphalt composition. The blend can be a physical mixture of the two, a melt blend that can be cooled and shaped into a flake, pellet, briquette or other shape prior to being combined with the non-oxidized base asphalt, or a melt blend that is added directly to the non-oxidized base asphalt. In another example, the performance additive(s) and the low MW polyolefin are added separately to the non-oxidized base asphalt at the elevated temperature to form the asphalt composition. At least a portion of the performance additive(s) may be added to the non-oxidized base asphalt prior to, concurrently, or subsequently to the addition of the low MW polyolefin.

EXAMPLES

The following are examples of asphalt compositions modified with low MW polyolefins and having improved oil bleeding resistance and heat resistance, with each of the components set forth in weight percent. The examples are provided for illustration purposes only and are not intended to limit the various embodiments of the asphalt compositions in any way.

Summary of Test Methods:

Softening Point, ° F. (SP): Measured according to the ASTM D36 method (a "ring and ball" method, "R&B SP").

Penetration, dmm at 25° C. (PEN): Measured according to the ASTM D5 method.

Stain index (SI): Measured according to the ASTM D2746 method.

Molecular Weight, $M_w$: All molecular weight reported in these examples are weight average molecular weights measured by gel permeation chromatography (GPC), which is a technique generally known in the art. For the purpose of GPC, the sample to be measured is dissolved in 1,2,4-trichlorobenzene at 140° C. at a concentration of 2.0 mg/ml. The solution (200 uL) is injected into the GPC containing two PLgel 5 μm Mixed-D (300×7.5 mm) columns held at 140° C. with a flow rate of 1.0 mL/minute. The instrument is equipped with two detectors (refractive index and viscosity detector). The molecular weight (Mw) is determined using a calibration curve generated from a set of linear polyethylene narrow Mw standards.

Example 1

Effect of Different Low MW Polyolefins on Stain Index

The non-oxidized base asphalt was heated in a metal can to an elevated temperature of about 190° C., to form a hot liquid asphalt, and the low MW polyolefins were added to the hot liquid asphalt. Then the hot liquid asphalt/low MW polyolefin mixture was blended for about 120 minutes until a homogeneous blend is obtained.

The stain index was determined for each sample using the ASTM D2746 method and the results are provided in TABLE 1 below.

TABLE 1

| Composition | additive chemistry | additive Mw | additive acid number or saponification number (mg KOH/g) | additive crystallinity (%)* | additive MFI @ 190 C.** | stain index (ASTM D2746) | stain index reduction (%) |
|---|---|---|---|---|---|---|---|
| base (mid-continent PG64-22) | NA | NA | NA | NA | NA | 102.65 | NA |

TABLE 1-continued

| Composition | additive chemistry | additive Mw | additive acid number or saponification number (mg KOH/g) | additive crystallinity (%)* | additive MFI @ 190 C.** | stain index (ASTM D2746) | stain index reduction (%) |
|---|---|---|---|---|---|---|---|
| base + 5% Honeywell A-CX 407 | functionalized LDPE | 4043 | 16 | 38 | 43,500 | 49.8 | 51.49 |
| base + 5% Honeywell Titan ® 8594 | PE homopolymer | 1360 | NA | 82 | >231,000*** | 39.8 | 61.23 |
| base + 5% 1500 GRS | FT wax | 1270 | NA | 87 | >950,000 | 38.8 | 62.20 |
| base + 5% Honeywell A-CX 1616 | functionalized PE | 4300 | 75 | 36 | 68,500 | 38 | 62.98 |
| base + 5% Honeywell Titan ® 8133 | PP homopolymer | 14900 | NA | 56 | 12,250 | 29 | 71.75 |
| base + 5% Honeywell Titan ® 8880 | functionalized PE | 7040 | 35 | 32 | >2,000 | 19.7 | 80.81 |
| base + 5% Honeywell Titan ® 8570 | functionalized PE | 2575 | NA | 100 | >155,000 | 10.7 | 89.58 |
| base + 5% Honeywell Titan ® 8903 | functionalized HDPE | 8800 | 25 | 77 | 4,600 | 10 | 90.26 |
| base + 3% Honeywell Titan ® 8903 + 2% Honeywell Titan ® 8822 | functionalized HDPE + functionalized PP | NA | 8903 (25) 8822 (87) | 8903 (77) 8822 (56) | 8903 (4,600) 8822 (27,000) | 9.65 | 90.60 |
| base + 5% Honeywell Titan ® 8822 | functionalized PP | 8560 | 87 | 56 | 27,000 | 9 | 91.23 |

KEY:
SI = Stain Index as measured according to the ASTM D2746 method
PE = polyethylene
PP = polypropylene
FT Wax = Available from Sasol or Shell
Reduction of SI (%) was calculated based on the stain index of the first sample containing only base (mid-continent PG64-22)
LDPE = low density polyethylene
HDPE = high density poylethylene The test results provided in TABLE 1 show that addition of polyethylenes, polypropylenes, or a combination of both, having weight average molecular weights below 15,000, all provide asphalt compositions having an improved (reduced) stain index compared to untreated asphalt, with functionalized polyethylenes and functionalized polypropylenes providing the greatest reduction in stain index. Since a stain index less than about 20 is desired in the industry for roofing applications, it appears that functionalized polyolefins are advantageous as the low MW polyolefins.

In an exemplary embodiment, the example further indicates various properties of the various low MW polyolefins including the additive chemistry, the weight average molecular weight (Mw), the acid number (ASTM D-1386) or saponification number, the crystallinity (e.g., from about 30 to about 100%), and the melt flow index (MFI). In particular, the saponification number is determined by refluxing ~0.3 gm of maleated polymer in 150 mL of xylenes, 5 mL of fresh methyl ethyl ketone and seven drops of water for 15 minutes. The solution is allowed to cool slightly and 10 mL of isopropyl alcohol and 3-5 drops of a phenolphthalein indicator solution are added. The solution is titrated with a standardized 0.0535N KOH/isopropyl alcohol solution drop wise until a persistent faint pink solution is reached. A blank should be run to compensate for acidic impurities in the various solvents. The *crystallinity was determined by using DSC ($2^{nd}$ reheat) using 290 J per gram as reference for 100% crystalline polyethylene (PE) and 190 J per gram for 100% crystalline polypropylene (PP). The DSC was run in a heat, cool, reheat cycle at 10° C./minute heating and cooling rates. The samples were initially cooled to −50° C. then heated to 150° C., then cooled back down to −50° C., and re-heated to 150° C. The MFI were determined from Brookfield viscosity. MFI equals 9,500,000/(cps @190° C.); where cps @ 190° C. was the Brookfield viscosity of the polymer, in centipoise, measured at 190° C. Where *">" is used, viscosity at 140° C. was used instead of viscosity at 190° C.; therefore, the actual MFI at 190° C. will be higher because of the relationship that viscosity decreases (MFI increases) with increase in temperature.

Example 2

Effect of Low MW Polyolefins, GILSONITE® and Pitch on Various Asphalt Composition Characteristics The non-oxidized base asphalt was heated in a metal can to an elevated temperature of about 190° C., to form a hot liquid asphalt, and the low MW polyolefin and GILSONITE® were added to the hot liquid asphalt. The low MW polyolefin and GILSONITE® can be added the hot liquid asphalt together or one after the other. Then the hot liquid asphalt/low MW polyolefin/GILSONITE® mixture was blended for about 120 minutes until a homogeneous blend is obtained.

GILSONITE®—is the registered trademark for a form of natural asphalt found only in Utah, commonly known as uintaite or uintahite, and which resembles shiny black obsidian. GILSONITE® is a harder material than flux asphalt and paving grade asphalts, having a softening point (SP) of about 265-400° F. (129.4-204.4° C.) and a penetration value (PEN) of zero. GILSONITE® is commercially available, for example, from American GILSONITE® Company, located in Bonanza, Utah, U.S.A.

Pitch is generally a black or dark viscous substance obtained as a residue in the distillation of organic materials and especially coal tar, wood tar, or petroleum and used for waterproofing, roofing, caulking, and paving. The pitch used in this invention has a penetration of 2 dmm at 77° F. (25° C.), a R&B SP of 77° C., and a rotational viscosity of 1810 cPs at 300° F. (148.9° C.). The viscosity was measured according to ASTM D4402.

The penetration, softening point, and the stain index were each determined for each of samples A-E using the method indicated in TABLE 2. The sample compositions and test results are provided in TABLE 2 below.

Example 3

Effect of Low MW Polyolefin and an Elastomer (SBS Copolymer (e.g., Radial SBS, Dynasol 411)) on Various Asphalt Composition Characteristics The non-oxidized base asphalt was heated in a metal can to an elevated temperature of from about 180 to about 190° C., to form a hot liquid asphalt, and the low MW polyolefin and SBS copolymer were added to the hot liquid asphalt. The low MW polyolefin and SBS copolymer can be added the hot liquid asphalt together or one after the other. The hot liquid asphalt/low MW polyolefin/SBS mixture was blended for about 120 minutes using high shear mixing equipment until a homogeneous blend was obtained. Test specimens were prepared for penetration and the R&B softening point measurement from the homogeneous blend. For heat resistance and cold bending measurement, test specimens were prepared by pouring the homogeneous blend onto a polyester mat to form a membrane with certain dimension.

TABLE 2

| Composition (by wt %) | additive chemistry | $M_w$ (Daltons) | A | B | C | D | E |
| --- | --- | --- | --- | --- | --- | --- | --- |
| mid-continent PG64-22 | NA | NA | 100% | 85% | 85% | 85% | 85% |
| GILSONITE ® | NA | NA | 0 | 10% | 10% | | |
| pitch | NA | NA | | | | 10% | 10% |
| HONEYWELL TITAN ® 8903 | funtionalized HDPE | 8800 | 0 | 5% | 3% | 5% | 3% |
| HONEYWELL TITAN ® 8822 | functionalized PP | 8560 | 0 | | 2% | | 2% |
| Total | | | 100% | 100% | 100% | 100% | 100% |
| Test Results | test method | | | | | | |
| PEN @ 25° C., dmm | ASTM D5 | | 78.2 | 16.4 | 14.6 | 34.6 | 27.6 |
| R&B SP, ° C. | ASTM D36 | | 46.95 | 88.75 | 99.15 | 81.50 | 113.75 |
| R&B SP, ° F. | ASTM D36 | | 116.51 | 191.75 | 210.47 | 178.7 | 236.75 |
| stain index | ASTM D2746 | | 102.65 | 4.8 | 2.45 | 9.95 | 7.45 |

KEY:
PEN = penetration
R&B SP = "ring and ball" softening point test method of ASTM D36

The test results provided in TABLE 2 appear to show that even when the asphalt is combined with GILSONITE® or pitch, addition of low MW polyolefins, such as functionalized polyethylene or polypropylene, provides sufficient improvement in asphalt compositions to reduce the stain index to less than 10, which is well within the range desired in the industry for roofing applications. In addition, the blend displayed by experiment B and E meet the property requirements for asphalt listed in ASTM D3462 (Standard Specification for Asphalt Shingles Made from Glass Felt and Surfaced with Mineral Granules). This ASTM standard is the most widely used specification for roofing shingle in North America, which requires the penetration of the asphalt to be above 15 dmm @ 25° C., while the R&B softening point is from 190 to 320° F. for polymer modified product.

The cold bending, heat resistance, penetration, and softening point were determined for each sample. The sample compositions and test results are provided in TABLE 3 below.

Cold Bending Test, ° C.:

Measured as follows: a test specimen has a dimension of 14 cm (long)*5 cm (wide)*5.5 mm (thick) with one surface is either a polyester or glass fiber mat. The test specimen is first conditioned in a liquid bath for about 1 hr. then the specimen is tested by a 3-point bending machine. The lowest temperature at which the specimen does not break is reported as the cold bending temperature.

Heat Resistance Test:

Measured as follows: a test specimen has a dimension of 10 cm (long)*5 cm (wide)*5.5 mm (thick) with one surface being either a polyester or glass fiber mat. The test specimen is attached to a hook and stands vertically in a hot oven set at 95° C. for 2 hours. At the end of the test, the amount of the movement (versus the mat) of the specimen is measured and reported as heat resistance (in mm).

TABLE 3

| | Formula | | | | | |
|---|---|---|---|---|---|---|
| Composition | 1 (Control) | 2 | 3 | 4 | 5 | 6 |
| asphalt | 89.19 | 89.46 | 90.07 | 89.66 | 89.46 | 89.45 |
| SBS (elastomer) | 10.81 | 9.19 | 9.48 | 9.44 | 9.42 | 9.65 |
| HONEYWELL TITAN ® 8903 | | 1.35 | 0.45 | 0.90 | 1.12 | 0.90 |
| Total | 1.00 | 1.00 | 1.00 | 1.00 | 1.00 | 1.00 |
| Total Polymer Loading | 10.81 | 10.54 | 9.93 | 10.34 | 10.54 | 10.55 |
| Test Results | | | | | | |
| cold bending temp (° C.) | −21 | −15 | −23 | −23 | −22 | −23 |
| heat resistance (mm) | 10 | 3.2 | 22 | 4.5 | 2.2 | 7 |
| penetration (dmm) | 44.1 | 45 | 46.2 | 42 | 41.0 | 43.6 |
| softening point (° C.) | 109.9 | 112.7 | 109 | 112 | 112.5 | 111.4 |

All compositional amounts are in weight percent (wt %), based on the total weight of the Formula The test results presented in TABLE 3 demonstrate that the combination of an elastomer such as an SBS copolymer with a very small amount (i.e., 0.45 to 1.2 wt %) of a functionalized low MW polyolefin, such as functionalized polyethylene, may in some cases provide sufficient improvement in the heat resistance property (<10) of the asphalt composition, while maintaining the cold bending temperature at −20 C or less, and not worsening the penetration or softening point properties of the asphalt composition. In addition, the total polymer loading can be reduced comparing with the control (SBS-only formulation). Reducing the SBS content results in a lowering of the viscosity. This translates to higher line speeds, reduced temperatures, etc. at the manufacturing plant.

Example 4

Effect of Low MW Polyolefin on Various Asphalt Composition Characteristics

TABLE 4

| | test method | specification (ASTM D3462) | base | blend 1 | blend 2 |
|---|---|---|---|---|---|
| 20/30 pen asphalt | | | 100% | 97% | 97% |
| Honeywell Titan ® 8570 | | | | 3% | |
| Honeywell Titan ® 8650 | | | | | 3% |
| Penetration (dmm, @ 25 C.) | ASTM D5 | >=15 | 25.20 | 18.20 | 19.20 |
| Softening Point (degree C.) | ASTM D36 | 88 to 113 | 55.45 | 103.85 | 98.95 |
| Stain index | ASTM D2746 | NA | 60.17 | 2.17 | 5.00 |

The test results presented in TABLE 4 demonstrate that a 20/30 Pen asphalt composition with a small amount (i.e., about 3 wt %) of functionalized low MW polyolefin improves the penetration, softening point, and stain index properties of the asphalt composition.

Example 5

Effect of Low MW Polyolefin on Various Asphalt Composition Characteristics

TABLE 5

| | test method | specification (ASTM D3462) | blend 1 | blend 2 |
|---|---|---|---|---|
| mid-continent PG64-22 | | | 70% | 68.25% |
| pitch | | | 30% | 29.25% |
| Honeywell Titan ® 8650 | | | | 2.5% |
| Penetration (dmm, @ 25 C.) | ASTM D5 | >=15 | 23.60 | 16.80 |
| Softening Point (degree C.) | ASTM D36 | 88 to 113 | 64.25 | 93.75 |
| Stain index | ASTM D2746 | NA | 51.50 | 8.50 |

The test results presented in TABLE 5 demonstrate that even when the asphalt is combined with pitch, addition of a small amount (i.e., about 2.5 wt %) of low MW polyolefin provides sufficient improvement in the asphalt composition to improve the penetration, softening point, and stain index properties of the asphalt composition.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. An asphalt composition for use in roofing applications comprising:
   non-oxidized base asphalt; and
   a low MW polyolefin present in an amount of no more than about 1.8 wt % based on the total weight of the asphalt composition, wherein said asphalt composition has a softening point from about 87.8 to about 160° C. (about 190 to about 320° F.), and a penetration of greater than about 12 deci-millimeters (dmm, or 0.1 mm) @ 25° C., and wherein the low MW polyolefin has a crystallinity of from about 30 to about 100 percent (%).

2. The asphalt composition according to claim 1, wherein the asphalt composition has a stain index of less than about 20.

3. The asphalt composition according to claim 2, further comprising a second type of asphalt chosen from: uintahite, Lake Trinidad Asphalt, Buton Asphalt, and combinations thereof, present in an amount of from about 5 to about 20 wt %, based on the total weight of the asphalt composition, and wherein the asphalt composition has a penetration of from about 12 to about 26 dmm, @ 25° C.

4. The asphalt composition according to claim 2, wherein the asphalt composition has a stain index of less than about 15.

5. The asphalt composition according to claim 1, further comprising one or more performance additives in a total amount of from about 5 to about 15 wt %, based on the total weight of the asphalt composition, and wherein the asphalt composition has a heat resistance of less than about 20 mm.

6. The asphalt composition according to claim 5, wherein the low MW polyolefin is present in an amount of from about 0.5 to about 1.2 wt % based on the total weight of the asphalt composition, and wherein the asphalt composition has a heat resistance of less than about 10 mm and a cold bending temperature of about −20° C. or lower.

7. The asphalt composition according to claim 6, wherein the one or more performance additives comprise an SBS copolymer present in an amount of from about 6 to about 12 wt %, based on the total weight of the asphalt composition.

8. The asphalt composition according to claim 1, wherein the low MW polyolefin has a weight average molecular weight ($M_w$) of from about 500 to about 20,000 Daltons.

9. The asphalt composition according to claim 1, wherein the low MW polyolefin is selected from: polyethylene homopolymer, polypropylene homopolymer, copolymers of two or more of ethylene, propylene butene, hexene, and octene, functionalized derivatives of said homopolymers, functionalized derivatives of said copolymers, or combinations of unfunctionalized and functionalized low MW polyolefins.

10. A filled asphalt material for use in roofing applications comprising:
   an asphalt composition present in an amount of about 30 to about 99 wt. % of the filled asphalt material, the asphalt composition comprising non-oxidized base asphalt and a low MW polyolefin which is present in an amount of no more than about 1.8 wt %, based on the total weight of the asphalt composition, wherein said asphalt composition has a softening point from about 87.8 to about 160° C. (about 190 to about 320° F.), and a penetration of greater than about 12 dmm @ 25° C., and wherein the low MW polyolefin has a crystallinity of from about 30 to about 100 percent (%); and
   an inorganic filler, recycled asphalt materials, or a combination thereof, which are present in a total amount of from about 1 to about 70 wt % of the filled asphalt material.

11. The filled asphalt material according to claim 10, wherein the asphalt composition has a stain index of less than about 20.

12. The filled asphalt material according to claim 10, wherein the asphalt composition further comprises one or more performance additives in a total amount of from about 5 to about 15 wt %, based on the total weight of the asphalt composition, and wherein the asphalt composition has a heat resistance of less than about 20 mm.

13. The filled asphalt material according to claim 12, wherein the asphalt composition has a heat resistance of less than about 10 mm and a cold bending temperature of about −20° C. or lower.

14. A method for making an asphalt composition for use in roofing applications, the method comprising the step of combining a low MW polyolefin and a non-oxidized base asphalt at an elevated temperature to form the asphalt composition, wherein the low MW polyolefin is present in an amount of no more than about 1.8 wt %, based on the total weight of the asphalt composition, wherein the asphalt composition has a softening point from about 87.8 to about 160° C. (about 90 to about 320° F.), and a penetration of greater than about 12 dmm @ 25° C., and wherein the low MW polyolefin has a crystallinity of from about 30 to about 100 percent (%).

15. The method according to claim 14, further comprising combining, at an elevated temperature, one or more performance additives in an amount of from about 5 to about 15 wt %, based on the total weight of the asphalt composition, with the low MW polyolefin, the non-oxidized base asphalt, the combined low MW polyolefin and non-oxidized base asphalt, or any combination thereof, to form the asphalt composition.

16. The asphalt composition according to claim 1 wherein the non-oxidized base asphalt is further defined as roofing flux having a penetration of greater than about 150 dmm.

17. The asphalt composition according to claim 1 wherein the functionalized low MW polyolefin comprises one or more functional groups selected from: an acid, an ester, an amine, an amide, an ether, and anhydride.

18. The asphalt composition according to claim 1 wherein the functionalized low MW polyolefin comprises maleated polyethylene, maleated polypropylene, ethylene acrylic acid copolymers, ethylene vinyl acetate copolymers, oxidized polyethylene, or combinations thereof.

19. The asphalt composition according to claim 1, wherein the low MW polyolefin is present in an amount of from about 0.5 to about 1.8 wt %.

* * * * *